(No Model.) 4 Sheets—Sheet 1.
A. WEYER.
GLASS FURNACE.
No. 439,029. Patented Oct. 21, 1890.

Witnesses
Luke P. Hayden
N. P. Wood

Inventor
AUGUST WEYER
Attorney
Albert R. Wood

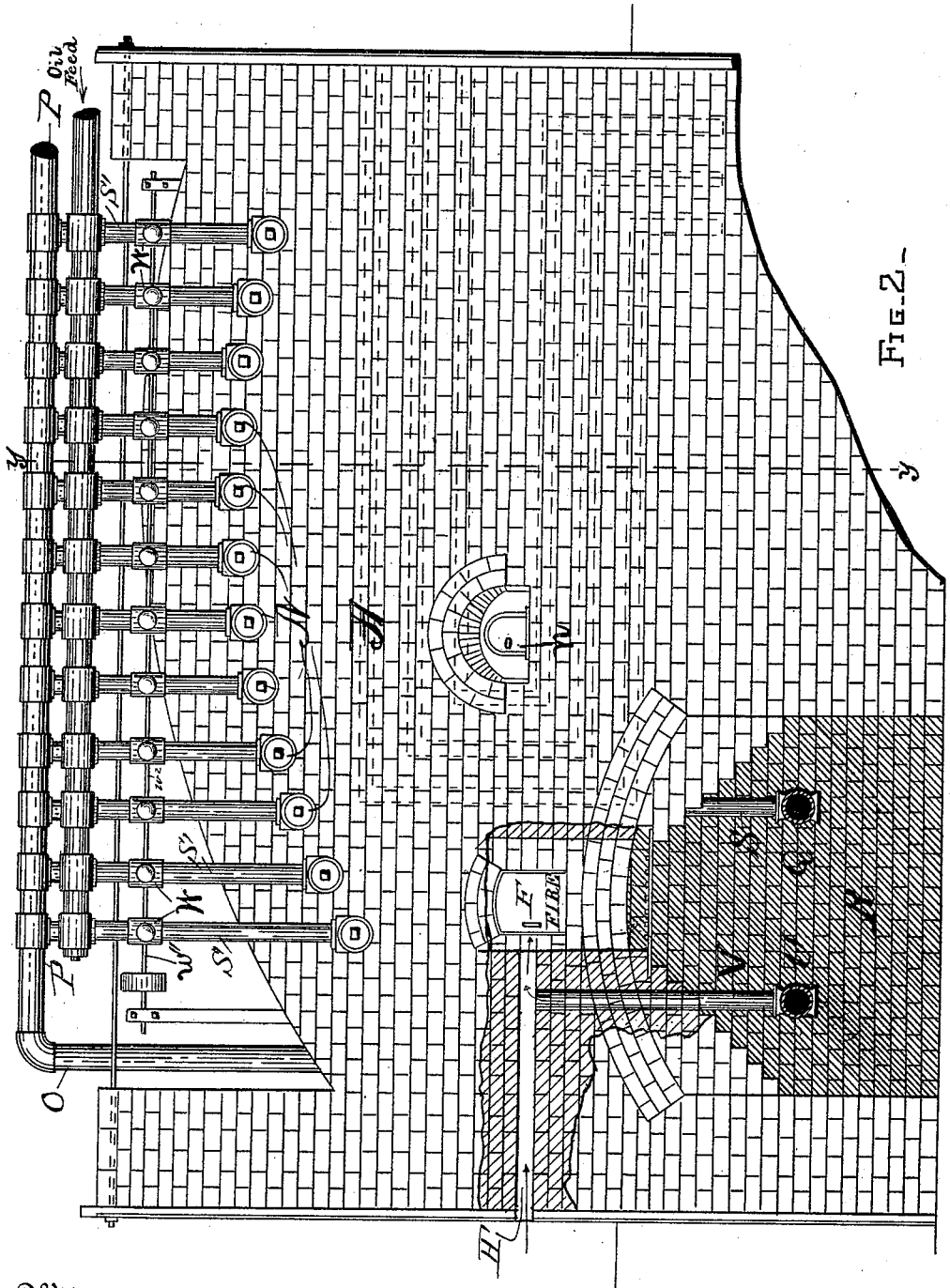

(No Model.) 4 Sheets—Sheet 3.
A. WEYER.
GLASS FURNACE.
No. 439,029. Patented Oct. 21, 1890.
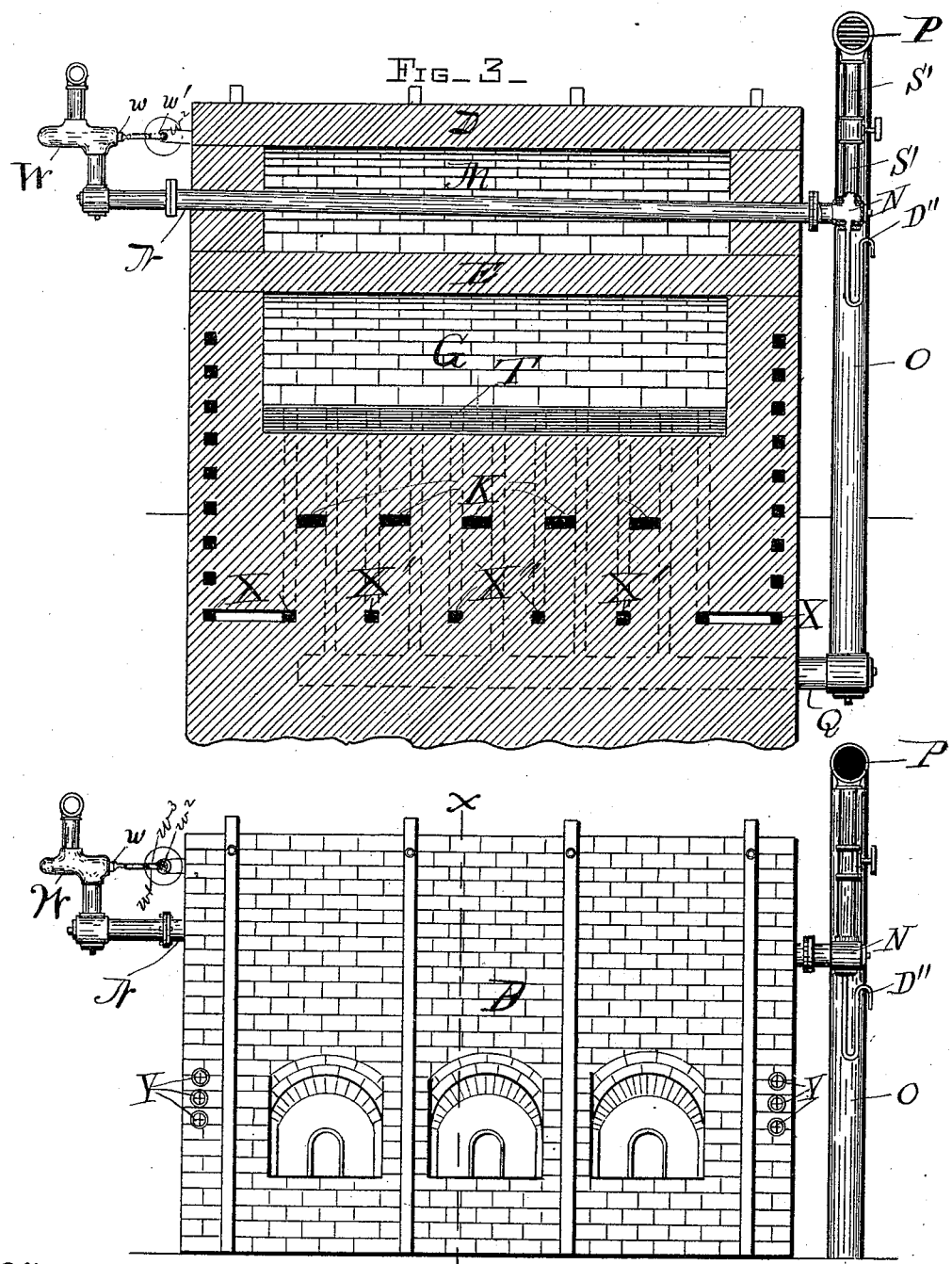
Witnesses
Luke P. Hayden
N. P. Word
Inventor
August Weyer
By Attorney
Albert A. Wood (No Model.) 4 Sheets—Sheet 4.

A. WEYER.
GLASS FURNACE.

No. 439,029. Patented Oct. 21, 1890.

Witnesses
Luke F. Hayden
N. P. Wood

Inventor
AUGUST WEYER
By Attorney

UNITED STATES PATENT OFFICE.

AUGUST WEYER, OF ATLANTA, GEORGIA.

GLASS-FURNACE.

SPECIFICATION forming part of Letters Patent No. 439,029, dated October 21, 1890.

Application filed July 29, 1889. Serial No. 319,030. (No model.)

*To all whom it may concern:*

Be it known that I, AUGUST WEYER, a citizen of the United States, residing at Atlanta, in the county of Fulton and State of Georgia, have invented a new and useful Continuous Gas-Generating Glass-Furnace; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of furnaces used in melting glass, and has for its object the construction of a device from which a uniform product can be obtained at any time by the operatives, in which the heat of the products of combustion which have passed through the heating-chamber can be utilized in a supplementary chamber to vaporize a fluid fuel, and which has means for carrying the said fuel to and through the said chamber and for conducting it in a vaporized form to place of ignition, and which has also flues passing through its walls for cooling the same.

The invention has further for its object the novel construction, combination, and arrangement of parts, hereinafter set forth, pointed out in the appended claim, and illustrated in the accompanying drawings.

Figure 1:
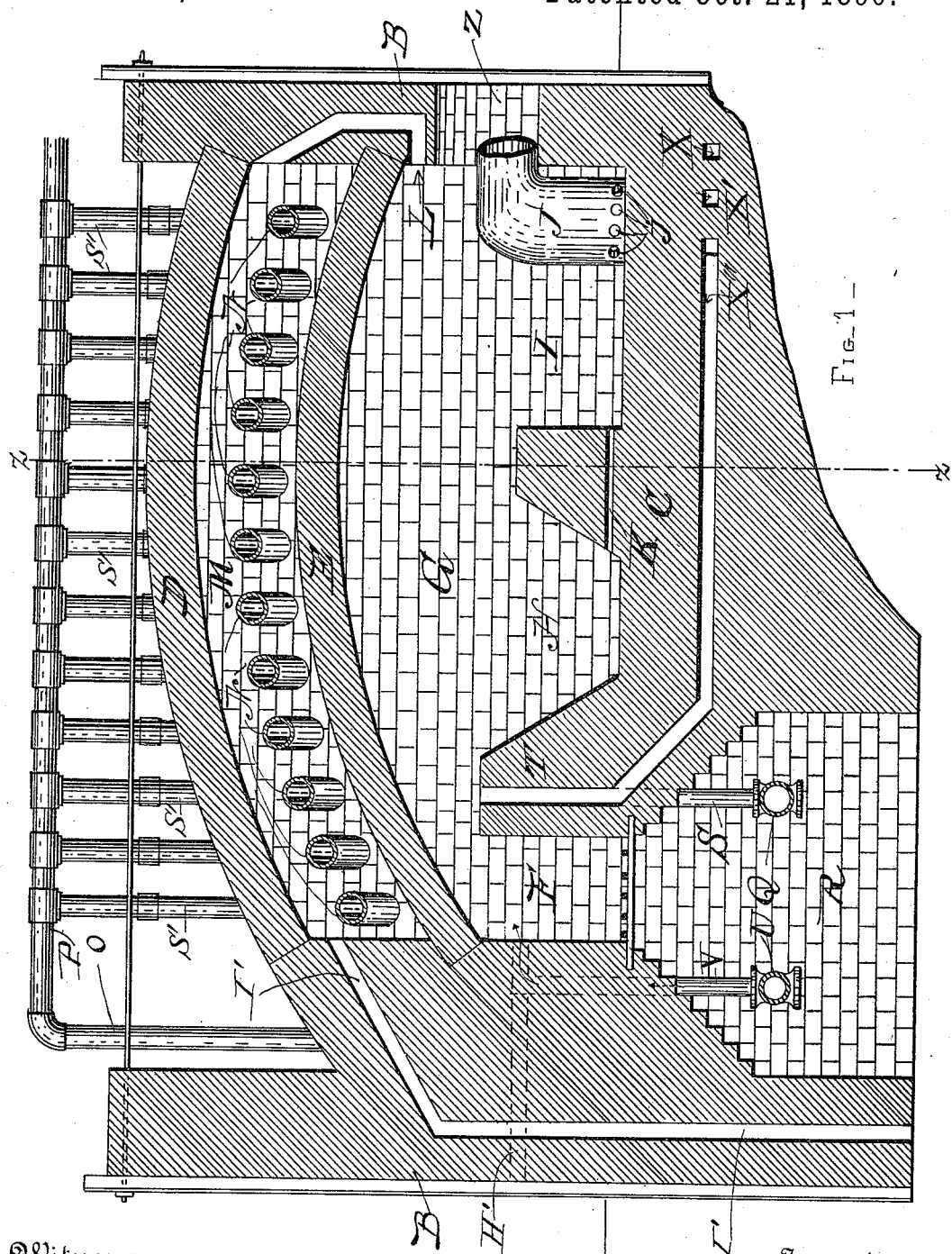
Figure 5:
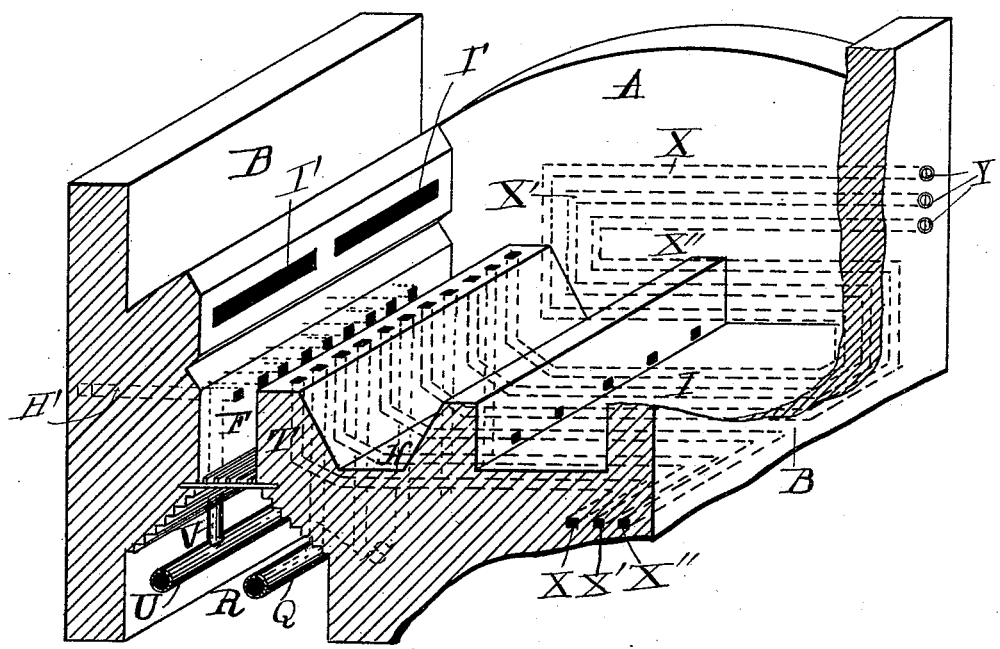
Figure 6:
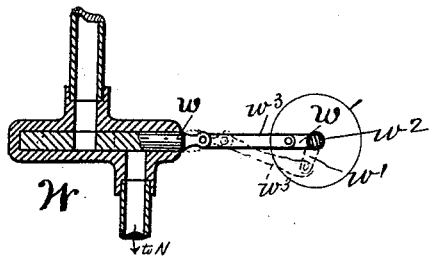

In the accompanying drawings, Figure 1 is a longitudinal vertical section on the line $x\,x$, Fig. 4. Fig. 2 is a side elevation from the same side as the sectional view seen in Fig. 1. Fig. 3 is a vertical cross-section on the line $y\,y$, Fig. 2, cutting the figure relative to the interior parts, as shown in Fig. 1 on, the line $z\,z$. Fig. 4 is an end elevation of the device, showing the front thereof. Fig. 5 is a perspective view of a portion of the interior floor and walls, such portion carrying part of the warm-air flues, &c., and showing their manner of circulating air through the walls and delivering it to the combustion-chamber. Fig. 6 is a longitudinal vertical sectional view of one of the oil-feeding valves, showing the pitman and crank for actuating same.

In the figures, like reference-marks indicating corresponding parts in the several views, A are the two side walls and B the two end walls of a furnace, and C is the floor and D the covering-wall, while E is a supplementary wall, forming in conjunction with the wall D an enlarged flue or heating-chamber, for purposes hereinafter fully set forth.

F is the fire-box, and G is the heating and combustion chamber. In the floor of the furnace on the lower side of said combustion-chamber G are the glass-holding crucibles H and I, the former containing the melting-glass material and the latter being connected thereto by the passages K, as shown in Fig. 1, which passages connect the two crucibles near their bottoms. The second crucible I is for the purpose of further melting the metal and of refining the same in the process. The form of connection between these two crucibles, substantially as shown, is superior to all other means for connecting them, inasmuch as it is on the extreme bottom or as near thereto as is practicable, which allows only the most dense glass to pass from one crucible to the other.

In the front of the crucible I and in close proximity to the working-holes Z are boots J, open at the bottom and having in their sides near the bottom the holes $j$ for the purpose of allowing the passage into such boots of the refined glass, and the refined glass only, said glass being taken from the bottom of the mass of metal in the crucible I. This boot has an aperture of the desired size and form at its top for the purpose of removing its contents, and is constructed of the ordinary refractory clay used for pots as ordinarily made. The batch, fed into the crucible H through the door $n$, Fig. 2, is melted, and as it melts moves forward, and other frit is thrown in, the forward movement of the melted glass consisting of its passage from crucible H through the openings K into the crucible I, where it is refined. It then passes into the boot J through the apertures $j$, thence to be used. The crucibles H and I may be lined with refractory clay or fire-brick or any material desired, or, if considered sufficiently durable for the purpose, may be left unlined. It is preferable that the crucible H have substantially the form in cross-section shown, for the reason that such form exposes the greatest surface possible to the direct action on the metal of the heat from the combustion-chamber. The precise form of the crucible I is immaterial so long as the boot J can be placed therein and so long as their is sufficient room for the movement of the upwardly and downwardly flowing currents of metal being refined, which movement is promoted by the difference in density between the refined and unrefined glass after the metal enters through the apertures K. In this construction the glass metal is found to be more pure and uniform in quality, the operation of the furnace is regular and continuous, and is not open to the vexatious emergencies in its operation, which occur in other furnaces of this general class, as it is impossible that there should be any breaking away of partitions or breaking of pots, avoiding the necessary results of such breakages. The boot J is the only part which it would be possible to break, and this is thoroughly protected by having glass metal all around it both on the inside and outside at the point where the strain usually comes in pots, and owing to its position uniform heat is had on its entire surface, which prevents straining and as there is no cooling down of the furnace and as these boots are protected there can be no breakage of them while in operation. The heated gases, after exerting the necessary effect in melting the glass, pass through the flue L into the chamber M, wherein are the pipes N, in which the oil is converted into vapor by the heat from the passing gases. The heat which is left after the expenditure necessary to melt and refine the glass is sufficient for this conversion. The pipes N appear in the chamber M in Figs. 1 and 3, where they are shown slanting in a direction which will cause the oil to move toward the end, where, in the form of vapor, it escapes into the vertical pipes O, Figs. 1, 3, and 4, through the pipes S' and P. A drip-pipe D'', Figs. 3 and 4, is attached to the end of each of the pipes N, consisting of a piece of pipe bent in the usual form for drawing off the residual products. The vertical pipe O passes downwardly from the pipe P and connects with the end of the pipe Q, which projects from the wall for that purpose, and extends into and through the wall and into the ash-pit R, the desired number of pipes S passing upwardly from said pipe Q and emerging into the combustion-chamber through the top of the partition T, at which point a burner of any approved form may be placed, or the embouchure of said pipes into the chamber may be through a tile of refractory clay or other fire-resisting material. If desired, a second pipe U may be connected with the upright pipe O, and other upright pipes V be connected thereto and pass upwardly through the wall on the opposite side of the ash-pit from the pipe Q and into the combustion-chamber, as shown in Figs. 1, 2, and 5.

The oil is fed into the vaporizing-pipes by means of the valves W, which valves consist of a casing having inlet and outlet offset something more than the size of said openings, and a plunger w, having a recess of a size equal to the amount of oil which it is desired to deliver at given times to the said vaporizing-pipes. This said plunger w is reciprocated by means of the crank w', Fig. 6, on the shaft w'', Fig. 2, which may be revolved in any manner convenient and at a speed that will cause the required amount of oil to be fed into the converting-pipes.

For the twofold purpose of keeping the walls cool by heat absorption and to carry the heat obtained from said walls to the combustion-chamber the air-flues X, X', and X'' are employed, which are arranged as follows, and, as will be obvious after a description thereof, protect the entire heated surface of the side walls and floor of the furnace, which would be burned by the heat otherwise:

At the front of the furnace at any convenient height and near the side corners of said front are placed adjustable registers Y, from which extend backwardly through the side walls of the furnace the flues X, X', and X'' at such a distance apart and such a distance back from said registers as will protect the desired internal superficial area of wall. After passing backward to the desired distance, these flues pass downwardly at approximately right angles to their former course, the flue X'' passing so far as will not leave any unprotected space between its upper and lower coil and the other flues following at about the same distance as formerly. These flues then pass forward to near the front of the furnace and then downwardly again to a short distance below the line of the top of the floor of the furnace, where they pass at a right angle to their former course and to the side wall, passing in this direction each so far as will start its continuation backwardly at the point necessary to protect the adjacent part of the floor and then turning toward the back of the surface of the floor, and so continuing until a convenient place shall be reached for their upward turn to their embouchures into the combustion-chamber between the gas-jets S, hereinbefore described, all of which pass through the fire-bridge T at the rear end of the combustion-chamber. There are two series of these flues X, X', and X'', preferably consisting in the furnace of the relative sizes shown, three flues entering on each side of the front of the furnace, each set of three flues forming a series in themselves independent of the other set.

The bottom of the furnace, or, it might be said, the bottom of the crucibles H and I, does not come into direct contact with the flame, its heat being only obtained from the metal in said crucibles. For this reason the bottom is not subject to so great injury from the heat, and for this reason the flues passing through the brick-work under said crucibles do not need to be so close together, the farther separation of these flues in this instance being possible owing to the greater size laterally of the bottom than height of the wall coming in contact with the flame.

When an extra set of gas-jets V is used having their embouchure into the combustion-chamber in the side of the fire-box, flues H' for supplying these extra jets with the requisite oxygen are placed alternately therewith and enter directly through the side of the furnace. It may be, however, that sufficient air can be obtained from the grate-surface for these jets, in which case it is obvious that the extra air-flues would be a superfluity and would be omitted from the construction.

An outlet for smoke from the supplementary heating-chamber M to the chimney can be had in any approved manner, the specific manner shown, however, being a flue or passage I', opening from said chamber and passing downwardly to communicate with a horizontal flue communicating with the chimney.

The operation of this device is as follows: The crucible H being filled to the desired depth with the batch, fire is applied in the fire-box and the furnace gradually heated to the desired temperature. During this heating and after the vaporizing-pipes have been heated by the caloric current passing around them to the desired temperature to vaporize the oil, the valves admitting the oil into the converting-pipes are set in operation and oil is fed into said pipes and is vaporized. The vapor, after passing through the various pipes and manifolds described as being for that purpose, enters the combustion-chamber, where it is fired and burned in the jets in the bank T and in the fire-box jets, either or both, air being admitted to said combustion-chamber in close proximity to said jets by means of the flues passing through the now heated walls, as herein described. The fire in the fire-box is then allowed to burn out, and the gas carries on the process of heating the batch and converting it into metal, which flows through the passages into the crucible I and thence through the openings j in the boot J, and thence to be taken out and used in the manufacture of glassware, it being by the action of the furnace converted into a high grade of glass metal, pure and uniform in quality.

Supplying a little of the batch to the crucible H as fast as the glass is used out of the boot and supplying the oil-reservoir with oil as fast as used will make the furnace continuous in its operation for an indefinite period of time, and these are all the operations necessary to keep the furnace in operation.

Having thus described my invention, what I claim as new, and desire to secure by Letters Patent of the United States, is—

In a furnace of the described class, the combination of the crucibles H and I, the main combustion and heating chamber over said crucibles, the bridge T, separating said chamber from the fire-box, the flues X, X', and X'', leading from the exterior of the furnace to the said combustion-chamber by passing through the side walls, the base, and the bridge T, the supplementary heating-chamber separated from the main chamber by the partition E, the flue L, connecting said chambers, the oil-carrying pipes M, passing through said supplementary chamber, and the pipes leading from the pipes M to the pipes S, said pipes S passing upward through the bridge T between the flues X, X', and X'' to the combustion-chamber, substantially as shown and described.

In testimony whereof I hereunto affix my signature in presence of two witnesses.

AUGUST WEYER.

Witnesses:
O. M. WADDLE,
ALEX. RICHARDS.